Patented Mar. 31, 1931

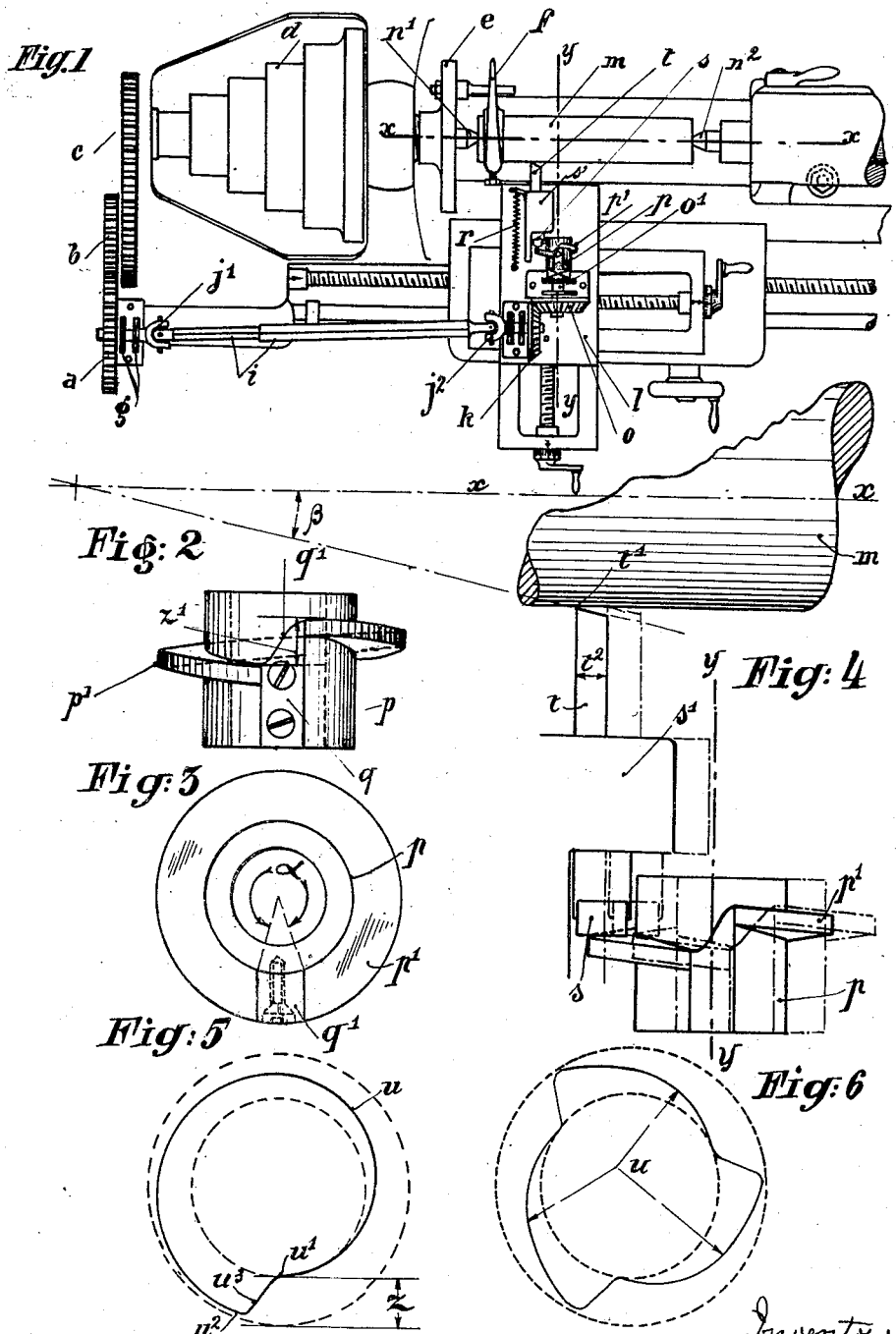

1,798,143

UNITED STATES PATENT OFFICE

HUGUES LOUIS DARDELET, OF NANTES, FRANCE, ASSIGNOR, BY MESNE ASSIGNMENTS, TO DARDELET THREADLOCK CORPORATION, OF NEW YORK, N. Y., A CORPORATION OF DELAWARE

LATHE ATTACHMENT

Application filed June 12, 1928, Serial No. 284,700, and in France June 15, 1927.

My invention relates to lathes and to a method of turning elements therein.

As is known in the art there exist screw cutting lathes, shaping lathes for milling-tools having a regular section, lathes for reproducing members whose cross-section present various forms, and in which the tool is given an alternating movement regulated by a guide of suitable form, whereas the member in question is given a movement of rotation.

If the section of the member is to follow a predetermined geometric line, the accuracy of the section of the member depends on the accuracy of the outline corresponding to the guide. In particular, if it is desired to obtain sections in the form of Archimedes spirals accurately or other accurate curves, guides must be provided in the form of accurate Archimedes spirals or the other curve, which is followed by the heel of the tool or toolpost which causes the extremity of the tool to follow an accurate Archimedes spiral in the turning plane of the member and by turning plane of the member is meant the imaginary plane perpendicular to the axis of the lathe, rigid with the said member and turning about the axis of the lathe. The production of such guides is extremely fastidious not only by reason of the precision in outline which they necessitate, but also because of their process of manufacture which must be accomplished with rigorous exactitude.

It is the main object of my invention to overcome these difficulties and make possible the obtainment of members having the cross-section of an Archimedes spiral, in a lathe, without previous outline.

The particularity of the process consists in this that the guiding assures feeding or displacement of the tool in a direction perpendicular to the axis of the lathe, that is, to the axis of rotation of the member to be worked which is established by a portion a spiral of a helix or thread of a screw, turning about an axis preferably perpendicular to the axis of the lathe and whose extremities are joined in a way to constitute a continuous guide path. Said spiral of a helix whose pitch is equal to the pitch of an Archimedes spiral which is desired to be obtained is itself turned in a screw cutting lathe without previous outline.

There may thus be obtained members whose section, on the whole or in part, is an accurate Archimedes spiral, and may consist of one or several accurate Archimedes spirals, and in particular guides whose sections are accurate Archimedes spirals which may be subsequently used in reproducing lathes.

The invention will be readily understood by those skilled in the art to which it relates in the following given by way of example when taken in connection with the accompanying drawing forming part of this specification and in which—

Fig. 1 is a conventional showing of a lathe adapted to turn members having a section according to an Archimedes spiral;

Fig. 2 is a front elevational view of a guide;

Fig. 3 is a plan view thereof;

Fig. 4 is a diagram illustrating the advancement of the guide and the tool;

Figs 5 and 6 are diagrams illustrating two different forms of spirals obtained with the same guide, in accordance with the speed of rotation of the guide and the member being worked and in accordance with the angle that the front cutting tool rest makes with the axis of the lathe.

Referring to Fig. 1, on an ordinary type of known lathe is provided a toothed wheel $a$ meshing, either directly or, as shown, through the medium of one or more toothed wheels $b$, with a toothed wheel $c$, mounted on the extremity of the lathe spindle $d$, or with any other toothed wheel of the lathe whose movement is derived from that of the spindle and which drives a plate $e$ with driving tappet $f$.

The shaft of said wheel $a$ is mounted in two bearings $g$ supported by a suitable bracket on the frame of the lathe. The wheel $a$ transmits its movement, through the medium of a telescoping shaft $i$ provided with universal joints $j^1$ $j^2$, to a beveled gear $k$ whose shaft is supported by bearings secured to the carriage $l$ of the lathe. Said carriage is adapted to be given a displacement perpendicular to the axis of rotation $x$—$x$ of the member being worked $m$ which is supported in the usual manner between the head stock $n^1$ and the tail stock $n^2$ of the lathe.

With the wheel $k$ meshes a wheel $o$, having the same or different beveling, whose shaft $o^1$ is journaled in bearings likewise fixed to the carriage 1. The extremity of shaft $o^1$ carries a guide $p$, shown in detail and on a larger scale in Figs. 2 and 3.

Said guide carries a thread of a screw or spiral of a helix $p^1$ constructed in the lathe and which extends through an arc $\alpha$ slightly less than 360°, the extremities of said thread being interconnected by an intercalary member $q$ fitted to the guide $p$ and whose surface $q^1$ is of the shape of an S in such a way as to be tangent to the said extremities and to constitute with the thread, a continuous guiding path. It is on this guiding path that the heel $s$ of the tool post $s^1$ in which is fixed a tool $t$ bears, under the action of a spring $r$. Said tool holder slides in a bearing of carriage $l$ allowing displacement perpendicular to the axis $x$—$x$ of the member being worked to be imparted thereto. Under these conditions, when the guide $p^1$ turns about the axis $y$—$y$, while the member turns about the axis $x$—$x$, the heel $s$ of the tool holder $s^1$ bears on the screw $p^1$, which being constructed in a lathe, is accurate and the extremity $t^1$ of the tool $t$ describes in the turning plane of the member (by turning plane is meant the imaginary plane rigid with the member $m$ perpendicular to the axis $x$—$x$), an Archimedes spiral $u$ of accurate form (Fig. 5), whose extremities $u^1 u^2$ are connected by a curve or rounded line $u^3$ corresponding to the form of fitting $q^1$ of screw thread $p^1$ of guide $p$. The pitch $z$ of said spiral (Fig. 5) is equal to the pitch $z^1$ of the screw thread in Fig. 2.

If the front cutting edge of the tool is a straight line contained in a plane passing through the axis, whose distance between perpendicular surfaces with respect to the axis (represented by $t^2$ Fig. 4) is at least equal to the advance, per revolution of the member, of the carriage and of which the slope on the axis $x$—$x$, represented by tan. $\beta$ (Fig. 4) fulfills certain conditions hereinafter pointed out, there is obtained, with the same guide, turned members of different form whose sections are elements of Archimedes spiral (Figs. 5 and 6) in accordance with the ratio of the speed of rotation of the guide and of the lathe and in accordance with the value given tan. $\beta$.

The members thus obtained on the lathe are helicoidal bodies or right cylinders whose cross sections are constituted by an Archimedes spiral as shown in Fig. 5 or several Archimedes spiral elements as shown in Fig. 6.

Let $Z^1$ be the pitch of the guide screw thread (Fig. 2);

$q$ the advance of the carriage per revolution of the guide and $q'$ the advance of the carriage per revolution of the member.

Suppose the circumference to be divided into $n$ parts ($n$ being more than 1 and as large as desired) and let $m$ be the number of said parts of which the rotation of the member is advanced or retarded on that of the guide.

Let N be the number of elements of the Archimedes spiral of which the section of the body is to be composed.

Let Z be the pitch of the Archimedes spiral constituting the cross section of the turned piece (Fig. 5).

Let Q be the pitch of the piece turned.

Let $\beta$ be the angle to be given the front cutting edge of the tool with respect to the axis of the lathe, which edge is contained in a plane passing through said axis (Fig. 4).

Then we have $$\frac{q'}{q} = \frac{n}{n \pm m} \quad \text{ratio of the speed of the guide and that of the member.}$$

$$Z = NZ^1$$

$$Q = \frac{Nqn}{(N-1)n \pm Nm}$$

$$\tan \beta = \frac{Z^1[(N-1)n \pm Nm]}{qn}$$

It will be noted that $n$, $m$, $q$ and $q'$ remain constant and that it is merely necessary to vary N for obtaining helicoidal bodies of different pitch and different number of threads, that is, whose section is composed of a number of different spiral elements.

Right cylinders being merely a particular case of helicoidal bodies where the pitch Q is infinite and the angle $\beta$ zero, it will be seen that right cylinders will be obtained having a number of Archimedes spiral elements in cross section when the following relation exists:

$$(N-1)n - Nm = 0$$

$$\frac{n}{n-m} = N$$

$$\frac{n}{n-m}$$

is the ratio of the speed of the guide to that of the member. There are thus obtained right cylinders only when said ratio of speeds is a whole number, provided that the angle $\beta$ has a value of zero, that is, that the front cutting edge of the tool is parallel to the axis.

A few concrete examples of the above theory will now be given.

Suppose the threaded guide to the left is rotated to the right and that the member turns in a counter clockwise direction with respect to an observer placed at the head stock $n^1$ and that the carriage is displaced in the direction of the tail stock to head stock or $(n^2 - n^1)$.

Suppose the guide to have a pitch of 24 mm. and that the advance of the carriage per revolution of the guide be 20 mm.

Suppose also that the circumference be divided into 12 equal parts and that the rotation of the member be lagging 5 of said parts per revolution of the guide, that is, that the ratio of guide speed and the member speed be 12:7.

There is obtained a helicoidal body whose section is an Archimedes spiral having a pitch of 24 mm. and the pitch to the right of said body will be Q=48 mm. if the angle $\beta$ be made the angle whose tangent is .5, the opening of the angle turned toward the tail stock, that is, the cutting edge of the opening is disposed as indicated at $t^1$ in Fig. 4.

There may be obtained other sizes remaining equal, but by giving to the tangent $\beta$ the value of .2 the opening of the angle being turned towards the head stock, that is, the tool remaining disposed in a position inverse to that of Fig. 4, a helicoidal body whose pitch will be 24 mm. to the right and whose section will be composed of two elements of spiral form having a pitch of 48 mm.

Another example, with the same pitch of the guide and same advance of the carriage, suppose the circumference to be divided into two equal parts and the member lags the guide a distance of two of these parts, there is obtained a right cylinder whose section is composed of two symmetrical spiral Archimedes elements whose pitch will be 48 mm., if tangent $\beta$ is given a value equal to zero, that is, if the front cutting edge of the tool is parallel to the axis, since $$\frac{n}{n-m} = 2.$$

But if there is given to this angle a value such that tangent $\beta = .6$ with the angle opening toward the tail stock, there is obtained a helicoidal body whose section comprises an Archimedes spiral having a pitch of 24 mm. and whose pitch to the right is 40 mm.

If the length of the front cutting edge between two lines perpendicular to axis $x$—$x$ that is, $t^2$, is at least equal to the advance, per revolution of the member, of the carriage and if the angle $\beta$ has been given a suitable value, the surfaces of the turned members will be smooth in the part where the section is a spiral, but not in the part of the fitting. In the opposite case the surfaces, in the part of spiral form will be streaked with threads corresponding to the form of the extremity of the tool and whose pitch is equal to the advance of the carriage per revolution of the member. Obviously when the members are streaked with threads their cross sections are no longer spirals of accurate Archimedes form. If the grooves on the fitting part (that between $u^1$ $u^2$ Fig. 5) are undesirable in the use to which the members are to be put, the said grooves may be removed by milling or grinding.

After having produced an arcuate Archimedes spiral according to the process above described, it may in turn be used as a spiral guide for turning a whole series of members.

While I have described what I deem to be the preferable form of my invention, I do not wish to be limited thereby since changes might be made in the details of construction and arrangement of parts without departing from the spirit of the invention as comprehended within the scope of the appended claims.

Having described my invention what I claim as new and desire to secure by Letters Patent is—

1. In a lathe having a carriage and a tool post slidable on the carriage toward and from the work, the combination with the carriage and tool post of a driven shaft disposed at right angles to the turning center of the lathe and journalled on the carriage, a tool post retracting spring connecting the tool post and carriage, a hub mounted on said driven shaft to turn therewith and carrying on its perimeter an integral helicoidal rib extending less than a full turn and having the form of the rib of a screw thread of constant pitch, the tool holder having a part held to one face of said rib by said spring, and a filler piece secured to said hub between the ends of said rib and having a side surface merging at its ends with that side surface of the rib which coacts with the tool holder.

2. A tool advance and retraction controlling cam for lathes comprising a hub having an integral helicoidal rib on its perimeter corresponding with a partial turn of a screw thread rib of uniform pitch, and a filler piece held between the ends of said rib and having one side face merging at its ends with the ends of one side face of the rib to form a continuous guiding surface at one side of the rib.

3. A tool controlling cam as claimed in claim 2, wherein the specified face of the filler piece curves in opposite directions from approximately mid-length thereof to its lines of merger with the specified side face of the rib.

In testimony whereof I have signed this specification.

HUGUES LOUIS DARDELET.